(12) United States Patent
Ross et al.

(10) Patent No.: US 8,775,373 B1
(45) Date of Patent: Jul. 8, 2014

(54) DELETING CONTENT IN A DISTRIBUTED COMPUTING ENVIRONMENT

(75) Inventors: Robert F. Ross, San Jose, CA (US); Harrison B. Caudill, Mountain View, CA (US)

(73) Assignee: Translattice, Inc., Santa Clara, CA (US)

(*) Notice: Subject to any disclaimer, the term of this patent is extended or adjusted under 35 U.S.C. 154(b) by 431 days.

(21) Appl. No.: 12/454,851

(22) Filed: May 21, 2009

Related U.S. Application Data

(60) Provisional application No. 61/128,393, filed on May 21, 2008, provisional application No. 61/128,392, filed on May 21, 2008, provisional application No. 61/128,453, filed on May 21, 2008, provisional application No. 61/128,452, filed on May 21, 2008.

(51) Int. Cl.
*G06F 17/30* (2006.01)
*H04L 29/08* (2006.01)

(52) U.S. Cl.
CPC .................... *H04L 67/1095* (2013.01)
USPC ......................................... 707/612

(58) Field of Classification Search
CPC .................................... H04L 67/1095
USPC .......................................... 707/612
See application file for complete search history.

(56) References Cited

U.S. PATENT DOCUMENTS

| | | | |
|---|---|---|---|
| 5,276,872 A | 1/1994 | Lomet et al. | |
| 5,283,894 A | 2/1994 | Deran | |
| 5,307,486 A | 4/1994 | Nakamigawa | |
| 5,537,585 A * | 7/1996 | Blickenstaff et al. | 1/1 |
| 5,717,921 A | 2/1998 | Lomet et al. | |
| 5,758,356 A | 5/1998 | Hara et al. | |
| 5,819,274 A | 10/1998 | Jackson, Jr. | |
| 6,687,793 B1 | 2/2004 | Thomas et al. | |
| 7,321,953 B2 | 1/2008 | Thomas et al. | |
| 7,653,668 B1 * | 1/2010 | Shelat et al. | 707/610 |
| 7,774,469 B2 | 8/2010 | Massa et al. | |
| 2003/0028636 A1 | 2/2003 | Cherkasova et al. | |
| 2005/0015466 A1 * | 1/2005 | Tripp | 709/219 |
| 2005/0071336 A1 | 3/2005 | Najork et al. | |
| 2005/0283649 A1 | 12/2005 | Turner et al. | |
| 2006/0080388 A1 | 4/2006 | Cherkasova et al. | |
| 2006/0168154 A1 | 7/2006 | Zhang et al. | |
| 2006/0184736 A1 | 8/2006 | Benhase et al. | |
| 2007/0005624 A1 | 1/2007 | Wu et al. | |
| 2007/0156842 A1 | 7/2007 | Vermeulen et al. | |
| 2007/0239725 A1 | 10/2007 | Bhat et al. | |
| 2008/0005199 A1 * | 1/2008 | Chen et al. | 707/204 |

(Continued)

OTHER PUBLICATIONS

Leslie Lamport, Time, Clocks, and the Ordering of Events in a Distributed System, Communications of the ACM, Jul. 1978, vol. 21, No. 7.

(Continued)

*Primary Examiner* — Alexey Shmatov
*Assistant Examiner* — Grace Park
(74) *Attorney, Agent, or Firm* — Van Pelt, Yi & James LLP

(57) ABSTRACT

Deleting content is disclosed. A delete request is received for a file that is distributed with a plurality of nodes. The file is replaced with a first delete token. A determination is made as to whether all nodes in the plurality of nodes have replaced their respective copies of the file with first delete tokens. The file is deleted.

21 Claims, 8 Drawing Sheets

(56) References Cited

U.S. PATENT DOCUMENTS

| | | |
|---|---|---|
| 2008/0010299 A1 | 1/2008 | Ogawa |
| 2008/0134163 A1 | 6/2008 | Golde et al. |
| 2008/0154851 A1 | 6/2008 | Jean |
| 2008/0154987 A1* | 6/2008 | Kottomtharayil et al. .... 707/204 |
| 2008/0168183 A1* | 7/2008 | Marcy et al. .................. 709/248 |
| 2008/0244030 A1 | 10/2008 | Leitheiser |
| 2009/0037433 A1 | 2/2009 | Nakamura et al. |
| 2009/0150566 A1 | 6/2009 | Malkhi et al. |
| 2009/0222462 A1 | 9/2009 | Alpern et al. |

OTHER PUBLICATIONS

Chen et al., Dynamic Replica Placement for Scalable Content Delivery, 2002.
Ghemawat et al., The Google File System, SOSP'03, Oct. 19-22, 2003.
Rowstron et al., Pastry: Scalable, Decentralized Object Location and Routing for Large-Scale Peer-to-Peer Systems, Nov. 2001.
Author Unknown, The Clearinghouse: Anti-Entropy and Infection Debacle, Apr. 18, 2003.
Aspnes et al., Skip Graphs, pp. 384-393, 2003.
Zhao et al., Tapestry: An Infrastructure for Fault-Tolerant Wide-Area Location and Routing, Apr. 2001.
Author Unknown, Analysis: Data De-Duping, Tools for Stripping Out Redundant Data Promise to 20-to-1 Reductions; Here's how the Various Options Compare, Mar. 16, 2007.
Rowstron et al., Storage Management and Caching in PAST, a Large-Scale, Persistent Peer-to-Peer Storage Utility, Nov. 2001.

* cited by examiner

After Fork, Before Write

After Fork, After Write to Filename:Chunk 2

US 8,775,373 B1

DELETING CONTENT IN A DISTRIBUTED COMPUTING ENVIRONMENT

CROSS REFERENCE TO OTHER APPLICATIONS

This application claims priority to U.S. Provisional Patent Application No. 61/128,393 entitled COMPUTER BRICKS filed May 21, 2008, U.S. Provisional Patent Application No. 61/128,392 entitled DISTRIBUTED SYSTEM filed May 21, 2008, U.S. Provisional Patent Application No. 61/128,453 entitled COMMUNICATION SYSTEM filed May 21, 2008, and U.S. Provisional Patent Application No. 61/128,452 entitled FILE SYSTEM PRESENTATION AND EMAIL APPLICATION filed May 21, 2008, all of which are incorporated herein by reference for all purposes.

BACKGROUND OF THE INVENTION

One way entities such as companies typically distribute their computing resources is by using a centralized manager model. Information such as where on the distributed system resources can be found is maintained on a (typically single) master node. Unfortunately, such configurations can be expensive. The centralized manager typically requires robust hardware, and also requires careful and attentive administration. This is so because, while the resources may be distributed across multiple nodes, such as for redundancy and reliability purposes, if the master node becomes unavailable, so too does its index. One of the purposes of peer-to-peer technology is to mitigate the problems associated with the single point of failure that a centralized manager model presents. Unfortunately, peer-to-peer configurations are typically not suitable for corporate or other business computing use because they tend to lack the ability to maintain data security and similar management features.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
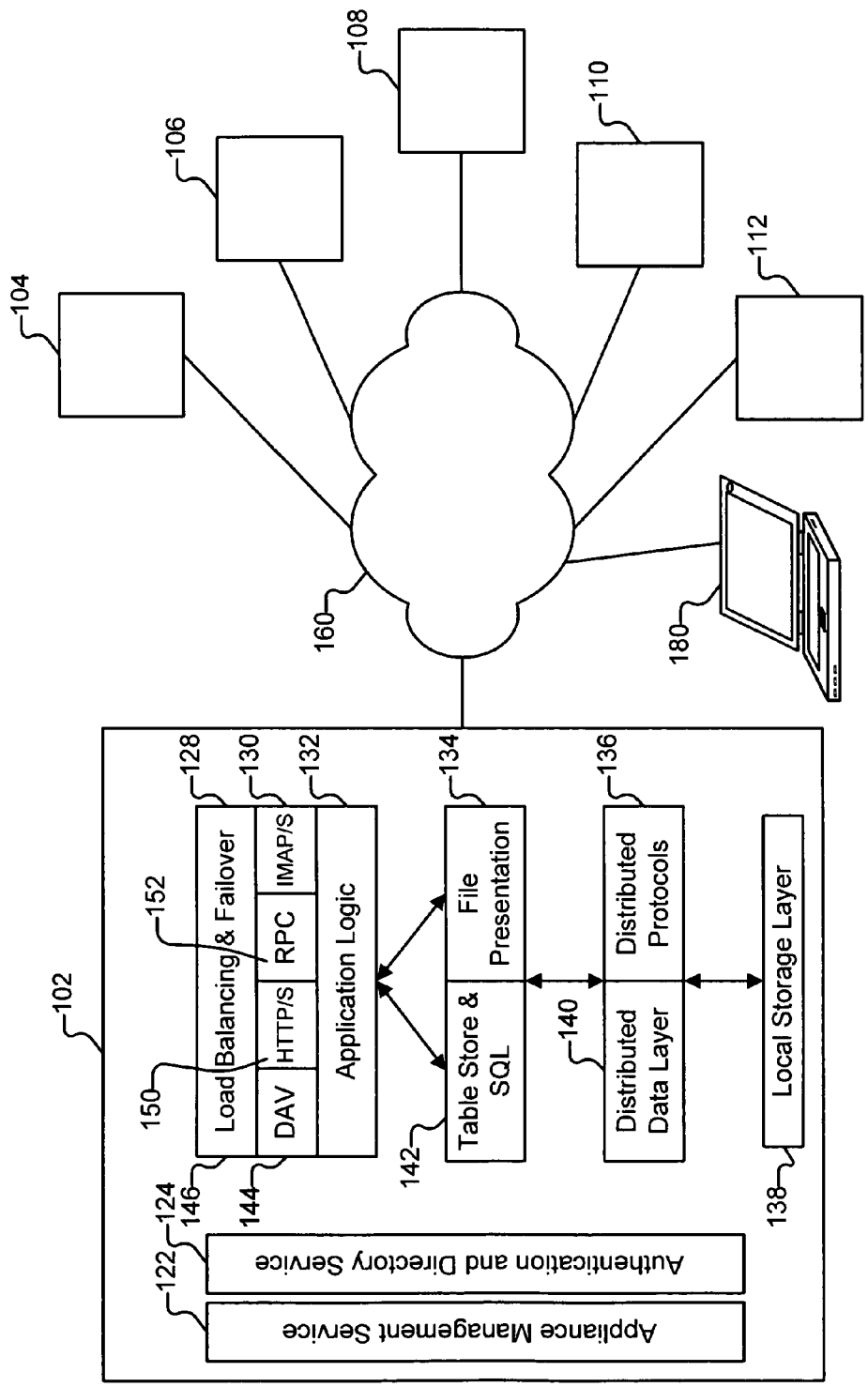
FIG. 1 is a block diagram illustrating an embodiment of a distributed computing environment.

FIG. 1 is a block diagram illustrating an embodiment of a distributed computing environment. In the example shown, nodes 102-112 are in communication via one or more networks (e.g., the Internet and/or one or more intranets) represented herein as a single network cloud 160. Each of nodes 102-112 is configured to be able to provide multiple resources (e.g., to users) that are traditionally individually provided by specialized hardware. For example, each of nodes 102-112 is configured to perform load balancing, caching, and to supply redundant storage as needed.

Node 102 comprises typical commercially available server hardware and includes one or more processors, RAM, physical storage, and other appropriate components such network interface hardware. Nodes 104-112 are also constructed from typical commercially available hardware components, but need not be identical in their construction to node 102. For example, Node 102 may have been purchased a year ago and have half the RAM of node 112, which was purchased more recently. Similarly, node 106 may have eight processors while node 108 may have only two. Nonetheless, as explained in more detail below, the nodes shown in FIG. 1 cooperate to provide users with a robust computing environment.

As illustrated in FIG. 1, node 102 (and similarly, each of nodes 104-112) includes a variety of logical components. Specifically, node 102 (also referred to herein as an "appliance") includes an administrative interface service 122, an authentication and directory service 124, a local storage layer 138, a distributed data layer 140, a table store 142, application logic 132, a load balancing and failover layer 146, and a file presentation layer 134. Node 102 also supports traditional protocols such as IMAP (130), HTTP (150), and the DAV extension (144), distributed protocols (136) described in more detail below, and other resources such as remote procedure calls (152).

An administrator (hereinafter referred to as "Alice") uses interface 122 to configure and maintain node 102, either by using a monitor and keyboard attached to node 102, or by connecting to it (e.g., using a web browser) from a remote computer. During an initial configuration, Alice provides cluster identity information to node 102. If node 102 is the first such node (e.g., nodes 104-112 have not yet been configured), security parameters are also initialized. For example, during initial configuration Alice will provide information such as the name of the organization (e.g., "Acme Corporation") and specify administrative account information such as by providing a username and supplying an authentication token such as a password to associate with the administrative account.

If node 102 is not the first node in the environment (i.e., there is an existing "cluster" of nodes to which node 102 is being added), Alice can configure it for addition to the cluster by providing the new node with a copy of the existing security parameters. As one example, suppose security is provided in the environment by a private/public cryptographic key pair. New nodes (that have not yet joined the cluster) can be provided with a copy of the key pair, allowing them to introduce themselves to the rest of the cluster. In various embodiments, in addition to the security information, an administrator either provides nodes with an address of at least one existing cluster node, or nodes broadcast (e.g. on network 160) to discover existing nodes.

In addition to configuring nodes with cluster and security information, Alice also configures a set of users, roles, and other information, which is stored in authentication and directory service 124. The actual data stored by directory service 124 can be stored with traditional local methods or using the global distributed data store, as applicable. In some embodiments an administrator provides this information directly, such as by creating accounts, setting attributes (e.g. name and department), roles, and permissions, and assigning security tokens for the users to authenticate themselves. Alternatively, the administrator can also perform this portion of the setup by providing a network address of an existing authentication server such as an Active Directory, LDAP, Kerberos, or other such system. The existing data may be used through the external source with each request or may be synchronized from the external source once such that all future updates happen separately from the external source. In such a scenario, node 102 would use the directory data as configured in the appropriate external source.

After the initial configuration described above, Alice next configures node 102 to deploy an application (e.g., as application logic 132). For example, suppose Acme Corporation wishes to replace an existing enterprise mail server such as a LOTUS NOTES server with a compatible mail system that makes use of the distributed storage and indexing techniques described herein. Other examples of applications that can run on node 102 include database applications, file storage applications, and virtually any other traditional computer server application that would benefit from our distributed platform environment. Each application can be configured to use an appropriate namespace or namespaces in the distributed storage environment. Each of these namespaces can be defined to have a different set of properties and storage requirements.

In some embodiments Alice uploads a file or set of files that contain the application software as well as data about how the application should be configured. In some embodiments node 102 is preconfigured with the necessary files and they need not be uploaded by the administrator in order to deploy and configure. Alice also specifies the appropriate parameters such as maximum mailbox size for a user, which network port or address to use for traffic, what kind of encryption settings to use, what kind of redundancy is required for the various application data, what kind of security restrictions need to be placed on various users or features, and any other relevant parameters.

Once the application is configured on node 102 it can be deployed. Specifically, the application is distributed, as applicable, to other nodes in the cluster, and then the various copies of the application are started. The email application is configured to support typical protocols such as IMAP and MAPI. Once the application is running, users can configure their respective existing mail clients to communicate with the new mail application. For example, in the environment shown FIG. 1, a user ("Bob") can configure a mail client residing on his laptop 180 to use the mail application provided by node 102. To accomplish this, Bob need only provide the IP address (or other appropriate identifier) of node 102 and his credentials to his existing mail client, as he would when configuring his mail client to communicate with a traditional mail server. That Bob's mail store is no longer stored in a traditional manner but is instead stored in a distributed fashion using the techniques described herein will be transparent to Bob's mail client.

Suppose that several months after the cluster shown in FIG. 1 is configured and running (e.g., with an email server application being provided by application logic 132), Acme decides to expand into a new geographical location (e.g., opening an office in Boston in addition to an existing office in San Diego). At such time, the cluster can be expanded to include additional new nodes by having Alice configure such new nodes using the techniques described above.

As mentioned above, node 102 includes various layers that abstract tasks such as the storing and retrieving of distributed data and allow existing applications—not specifically designed for use in a distributed environment—to be deployed in an environment such as the one shown in FIG. 1.

For example, file presentation layer 134 is a subsystem that is configured to appear to applications as a typical file system. In some embodiments the layer makes use of the FUSE library, which makes it possible to implement a filesystem in a userspace program. When an application attempts to read a file (e.g., located in the /filepresentation/directory), the file presentation layer is responsible for determining the location and contents of the indicated desired data and presents the information to the application in the manner the application expects. For example, user mailboxes may be stored on node 102 in a database, while an application may expect them to—on a traditional system—be stored as flat files. The file presentation layer creates a virtual file that presents the database information (e.g., retrieved via table store layer 142) as if it was a flat file to the application.

The filesystem can be mounted at an arbitrary mount point on node 102. And, the file presentation layer is configured to facilitate the demultiplexing of incoming filesystem operations based on the requested filesystem path. For example, a request for the /mail subdirectory will be dispatched to a module responsible for presenting email data from in a maildir format, while a request for the /html subdirectory will be dispatched to another module for generation of HTML/JSON files. The module to which the request is dispatched may reside on another node or in another application. Also, new modules can be registered with the demultiplexing system at any time including run time. One example module can process configuration data in template form to easily produce output in the desired format. The file presentation layer can also receive other parameters, for example, a specific regular expression to be matched against the path, specific permissions for operations to allow/disallow, etc.

Table store layer 142 is configured to provide a consistent set of functionality to applications that need to be able to access, manipulate, and store data in a table format. For example, applications can use table store layer 142 to request that a particular table be opened and only the rows of a table that include a particular entry (or having a value greater than a certain number, etc.) to be returned. Table store layer 142 wraps the functionality provided by various data providers. For example, one data provider on node 102 may be interfaced with a traditional database that is only stored locally. Another data provider on node 102 may store tables in memory. Yet another data provider on node 102 serves as a backend to the distributed data layer 140 described in more detail below. Typical applications that make use of typical database technology can thus be made to work in the environment shown in FIG. 1 with minimal changes.

If the data provider natively has efficient ways of performing table-related commands, then the data provider gets the commands passed through by the table store. If the data provider instead has a weak database implementation (e.g. does not natively support sorting) the table store can provide this functionality even though the data provider layer does not.

Distributed data layer 140 uses distributed protocols (described in more detail below) to link and manage the contents of each of the nodes' (102-112) respective local storage layers (which are described in more detail below). The distributed data store 140 is an interface that appears to be a typical file storage from the viewpoint of an application. However, when it receives a request to write a data chunk, rather than directly storing the data locally (e.g., on node 102), the distributed data layer 140 determines the appropriate location for the data among the nodes in the cluster and takes the appropriate actions to cause the data to be sent to that node's local storage 138. Accordingly, the data received by the distributed data layer 140 might ultimately be stored with local storage layer 138, or it might be sent to the local storage layer of another node such as node 108 (or to a plurality of nodes' local storage layers, as applicable).

Additionally, node 102 also includes load balancing and failover capabilities (128). For example, suppose that all Acme employees are instructed to use node 102 for mail server purposes. On Monday mornings at 8 am, or at other peak times, node 102 may have more connections than it can efficiently handle. In such a scenario, a variety of techniques can be employed to balance the demands for mail server functionality across multiple nodes in the cluster. One technique is for underused nodes (e.g., a node such as node 108) to periodically send messages to other nodes in the cluster advertising their underused state. An overused node (such as node 102 at 8 am Monday morning) can then attempt to push some of the traffic it receives to the underused node.

For example, if node 102 is overwhelmed in terms of CPU use or disk I/O then it may choose to keep processing the network traffic for a connection but not the actual requests. This decision can be made based on any control system attempting to regulate resource use. For an HTTP connection this would mean that node 102 becomes a silent proxy which relays everything to another HTTP connection to node 108. In this case node 108 is chosen to be a node which has the resources available that are necessary for handling the request. Protocols such as the RPC Portmapper, RFRI, NSPI, or other address mapping services can also be used to redirect connections. As another example, an HTTP connection can be redirected using an HTTP 302 response code. Each of these approaches allows node 102 to completely disconnect and free all resources while the client creates a new connection to node 108.

One way for nodes to advertise their current work load is by notifying the nodes responsible for responding to DNS queries. Whichever nodes are currently answering DNS queries will use this advertised work load information when forming responses to DNS queries. When a client such as client 180 first tries to connect to a service, DNS will direct the client to a node which is believed to be capable of handling the load. The DNS server itself can perform round-robin style load balancing between all of the servers it knows currently have excess capacity in order to prevent a surge of traffic to any one node. The DNS server can also use other techniques to perform load balancing such as randomly selecting from a population of known acceptable nodes. Yet another technique that can be used is a more sophisticated control system based on the name being requested from DNS and the resources known to be used on the nodes in question.

As yet another example, when applications are deployed in the environment shown in FIG. 1, the application can be configured to include metadata that provides a profile of what its resource use will be like. If the application is not pre-packaged with this information, such information can be collected automatically by the system or manually by the administrator. Either way, when a service such as DNS needs a designated node to respond to a particular protocol an intelligent selection can be made based on the profile information.

In the event that a node failure is detected by other nodes in the cluster, other nodes will no longer return it via DNS, RPC portmapper, RFRI or NSPI. Instead the work load that would have gone to the failed node is spread over any other available nodes. Also, another node on the same subnet can take on the failed node's internet or ethernet address, sending ARP packets as appropriate to receive the failed node's network traffic. This allows the node to assume the workload of users that are already connected to the failed node (potentially requiring them to reconnect). This also allows the node to receive and process DNS, RPC portmapper, RFRI queries or other lookups on either the old or the new addresses.

Local Storage Layer

Figure 2:
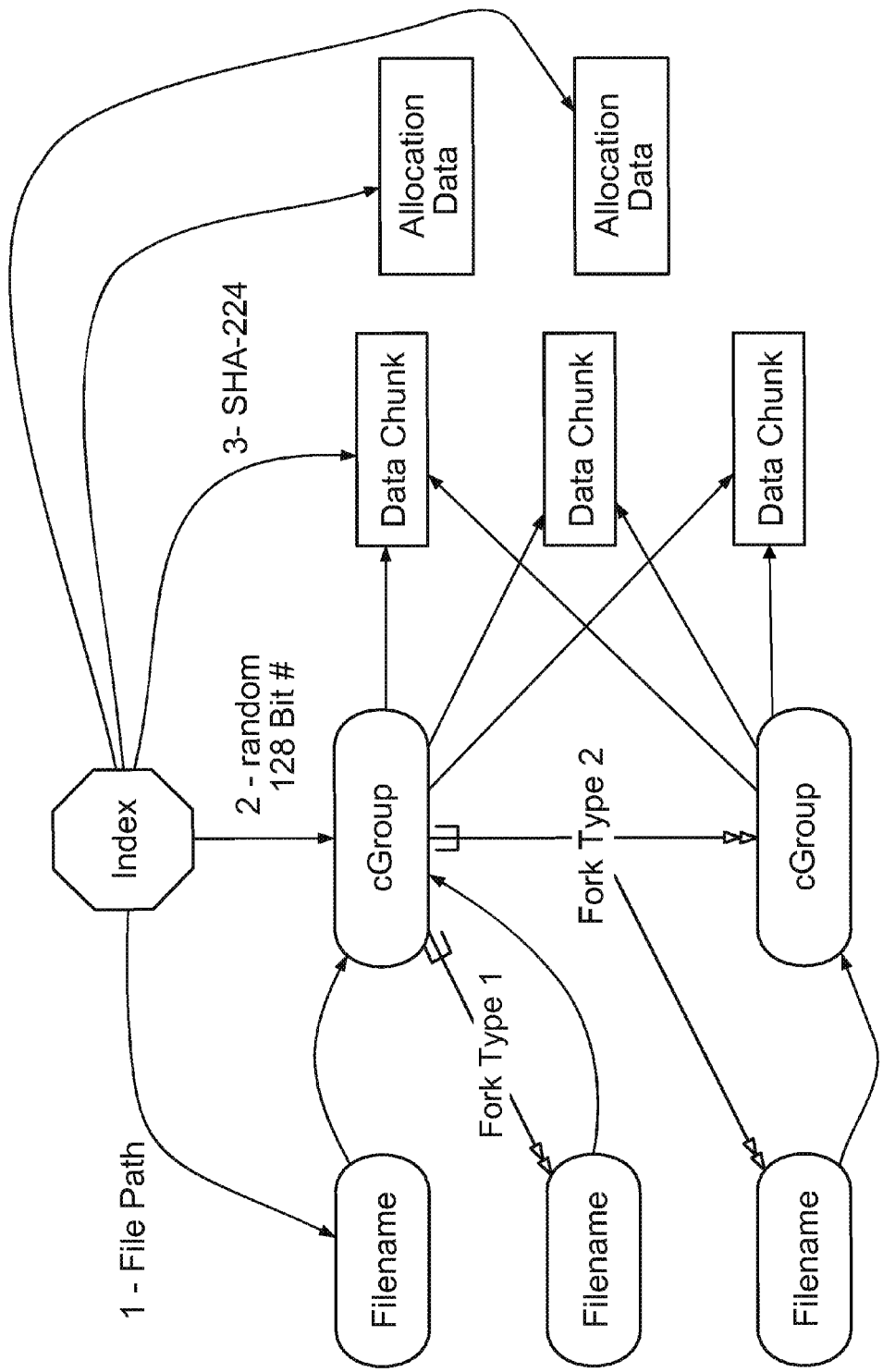
FIG. 2 illustrates an abstraction of a local storage according to some embodiments.

FIG. 2 illustrates an abstraction of a local storage according to some embodiments. As described in more detail below, local storage layer 138 is write-optimized (instead of read-optimized). It provides for storage of data objects and, by allowing the same piece of data to be referred to under different names, allows applications to take advantage of various indexing models. Local storage layer 138 also supports a set of snapshot operations that allow the state of the entire store at a given point in time to be preserved. The snapshot operation can be used to simplify backup and archiving related application tasks.

The local storage layer includes three main indexed elements: file path names (also referred to herein as "object names"), content groups, and data chunks. Other indexed elements used for tracking purposes exist, such as the allocation records which keep track of the reference count of individual disk blocks. While it is possible for the storage layer to function with physically separate indices, in some embodiments a single index is used to store all of these records. The single physical index distinguishes between the different logical indices by using a unique prefix to distinguish between the namespaces. One benefit of the indexes being combined is that changes to the combined index (containing records, allocation data, and any other ancillary data) can be made with a single transaction as described in more detail below. The object name index maps an object name (which is an application-visible name—such as a file path) to a content group. The content group index provides a mapping from a content group ID to a set of data chunks. Local storage layer 138 thus provides a layer of indirection. Instead of mapping a file name directly to data, an extra layer is provided so that forking actions (which allow for faster write operations) can be performed. The final index includes a cryptographically secure hash (such as a SHA-224 hash) of each stored data chunk to prevent data duplication. Other cryptographic hash functions can also be used and the techniques described herein adapted as applicable. If a block already exists with the same SHA-224 hash then the reference count is incremented for the existing block and the existing block is referenced directly by the content group rather than creating a new data chunk. In some embodiments the data chunks are located entirely on the local disk. In other embodiments at least some data chunks may reside in other physical locations. The local storage layer may also store attributes relating to any object in the portion of the tree referring to a file, in a content group, or in a data chunk.

The local store supports a variety of operations such as object read, object write, object replacement, object deletion, and iteration/listing of objects. The local store also supports two "fork" operations that allow content to be referred to by multiple names. The local store also supports de-duplication of data chunks without the use of either fork operation by comparing the SHA-224 hash for each data chunk. As part of any operation accessing, modifying, or creating an object, various attributes may be set or changed. For example, these attributes may include object names, the process or processes responsible for creating the object, the user or administrator the processes are acting on the behalf of, object sizes, attributes specified by the application, metadata gathered from the object data, any file format or type information derived from file content, or any other pertinent information.

The first fork operation (a "fork type 1 operation") creates a new object name that points to the existing content group. If the content group is later changed (e.g., data is changed), the new object name will also inherit the changes. One use of a fork type 1 operation is to allow the same piece of information to be present in several indexes without having multiple copies of the information on disk.

The second fork operation (a "fork type 2 operation") creates a object name pointing at a copy of the content group. As a result of a fork type 2 operation, two content groups point to the same chunks. Any writes to the chunks will cause a copy on write and result in each content group pointing to a different chunk. The writing content group points to the new chunk data and the other content group continues to point to the unmodified chunk. Fork type 2 operations are used where multiple different objects currently contain the same information but will eventually diverge. This operation is an optimization of the SHA-224 data chunk de-duplication. The end result of a fork type 2 operation is identical to the end result of writing an identical file twice with two different names. The de-duplication by hash will cause the same data chunks to be re-used with an increased reference count identical to the state achieved through a fork type 2 of an existing file.

Figure 3A:
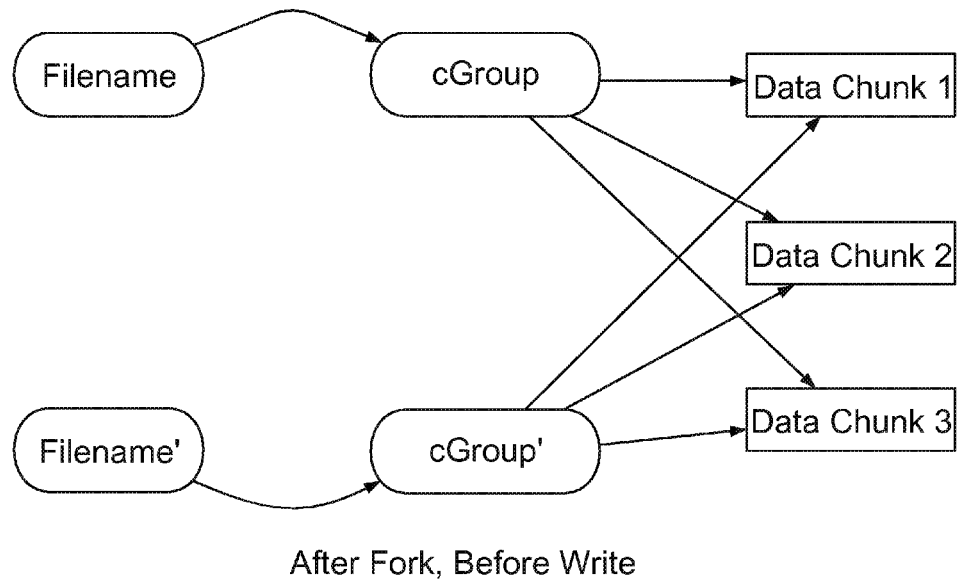
FIG. 3A illustrates an example of data prior to a fork type 2 operation.

FIG. 3A illustrates an example of data prior to a fork type 2 operation. In the example shown, both content group cGroup and content group cGroup' point to the same data chunks.

Figure 3B:
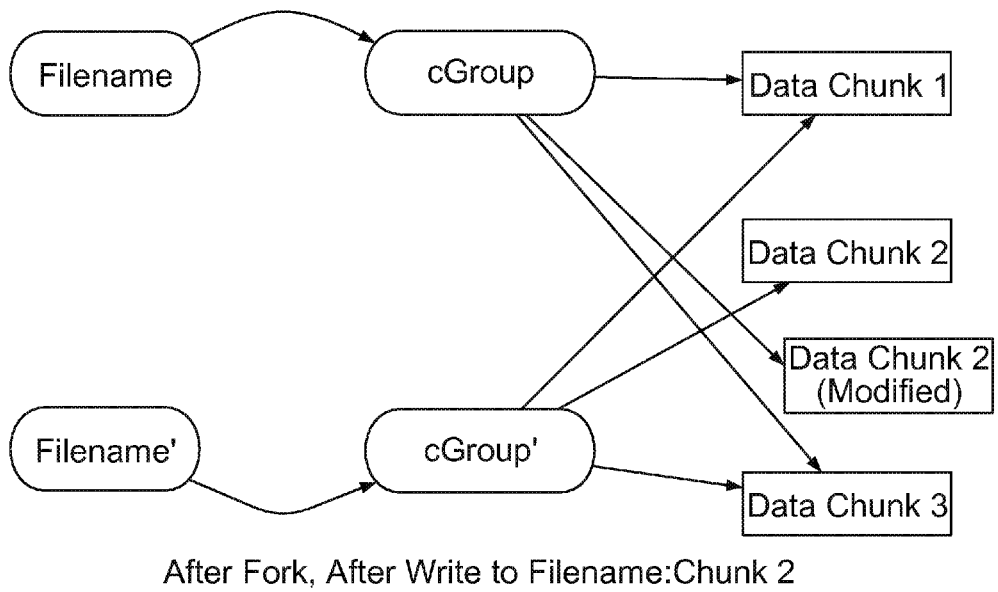
FIG. 3B illustrates an example of data after a fork type 2 operation.

FIG. 3B illustrates an example of data after a fork type 2 operation. In the example shown, a modification has been made to data chunk 2. Accordingly, while cGroup still points at the original set of three data chunks, cGroup' (which was created as the result of a fork type 2 operation) points to unmodified chunks 1 and 3, but now points to the modified version of chunk 2.

The On-Disk Format

Everything in the local storage layer's disk format is kept in a single on-disk B+Tree with facilities for both prefix and suffix compression. Different types of information (filenames, content groups, content chunks, and allocation data) are kept in different namespaces by prefixing the identifier used to retrieve them from the tree with different characters.

There are a number of locations on the disk which can hold the root of the tree; these locations are called "superblocks" and are hardcoded. Each root also contains a version number. When the store starts up, all of the superblocks are read to determine which has the latest version, and this one is used.

Also, during startup, the allocation data is read to find large, contiguous free blocks of the disk to be used during write transactions; this is built into an in-memory data structure called "the free list."

Block Cache Component

The local storage layer contains a block cache. The block cache keeps portions of the disk that have been recently accessed in memory, and dispatches IO operations.

An in-memory map data structure maps between the combination device ID (what disk) and block number, and the corresponding disk block. Another data structure is used to store, for each block, which store routines are waiting for it. Finally, there are locks kept so that an accessor can get an exclusive or shared reference to the block.

When a routine in the local store requests a block, first the cache is consulted. If there is no entry in the cache, then an entry is added to the list of routines waiting for that block. If no one else is waiting, the IO to retrieve that block is queued to be completed.

The block cache has a limited amount of memory assigned to it. If it is out of memory, the least-recently used cache blocks are evicted first. It is possible to "lock" cache blocks in memory if they are in use by a current transaction, and then they are skipped when the eviction routine scans for blocks to remove.

Snapshots and Reference Counts

All disk blocks have a reference count that is used for snapshot purposes. If a disk block is marked in the allocation tables with a flag meaning "alive in the current revision," then the reference count is kept relative to a count in the superblock. In one embodiment, a negative reference count indicates that the count is relative while a positive reference count indicates that the count is absolute. For example, if a block has a reference count of −3 and the superblock has a relative count of 1 then the block's reference count is be 1−(−3)=4. Reference counts are stored in the tree in the allocation data portion of the name space as mentioned above.

Additionally, each element in the tree has an internal reference count which keeps track of the number of times that this tree element is referred to by other places in the tree. This is used to determine when blocks are no longer alive in the current revision and can have their allocation block reference released. This internal reference count allows proper behavior even in the presence of de-duplication and fork type 1 operations as mentioned above. When a fork type 1 occurs the tree reference count is incremented for the content group involved in the operation. Likewise, when a fork type 2 occurs or de-duplication occurs because of duplicate data being written, the data chunks have their tree reference count incremented. Only when the tree reference count reaches zero for a content group or data chunk is the reference count in the allocation data released for the corresponding disk block.

When this release happens the "alive in the current revision" flag is set to false and the reference count on the disk block is changed to an absolute rather than a relative value.

Snapshots are stored in the tree index in their own namespace by keeping a copy of the old superblock as the snapshot itself. When snapshots are taken the old superblock is saved to a new location and linked from the snapshot portion of the index tree. The new superblock formed as part of the commitment of the snapshot operation has its relative reference count incremented, effectively adding one to the reference count of every used block that is alive in the current revision. Any overwrite of a file is handled by first removing the reference to the block which previously held the data and then writing the same data to a newly allocated block. In the case that the reference count begins as 1 the data moves to a new disk location. In the case that the reference count is greater than 1, however, the removed reference only decrements the count.

If the removed reference is removed due to a write to the current revision then it is necessary to update the allocation block to be marked as no longer "alive in the current revision." When this change happens the revision count is also changed from a relative count to an absolute count. For example, if the previous count was −3 and the global count was 1 then this would mean the reference count for the block before the write was 1−(−3)=4. After removing the reference from the current revision this would become 3. When the "alive in the current revision" flag is removed, the reference count is also changed to be absolute (3) instead of relative (−3) so that future snapshots do not affect the reference count of objects that are alive only in older snapshots.

Fast Writes

Figure 4:
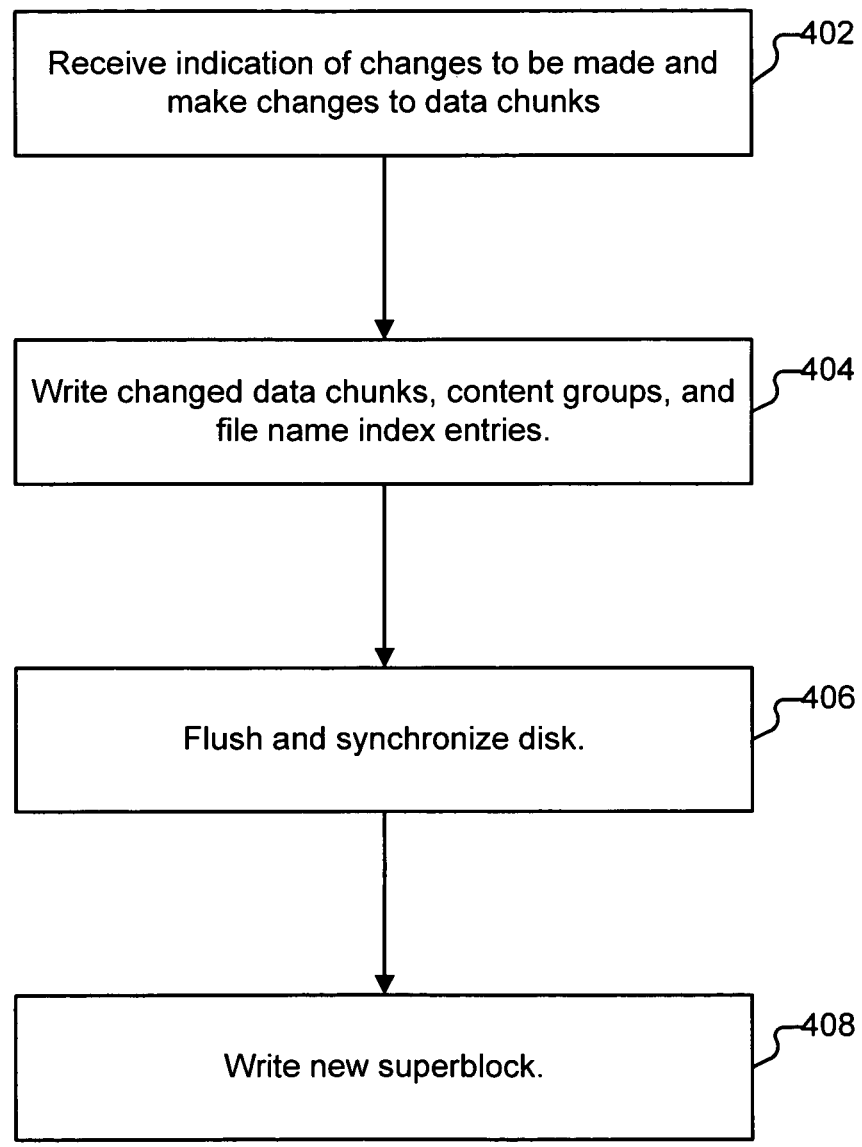
FIG. 4 illustrates an embodiment of a process for performing a fast write.

FIG. 4 illustrates an embodiment of a process for performing a fast write. In various embodiments, the process shown in FIG. 4 is performed by a node such as node 102.

The process begins at 402 when a process (e.g., running on node 102) receives an indication of changes to be made, performs the changes in the data structure, and returns a status indicating success or failure. The changes may be received from multiple processes and pertain to multiple pieces of data. In order to perform a write operation, the party desiring to make a change acquires a top-level exclusive lock (a lock on the root of the tree). Then, in memory, when iterating down the tree to the point to be changed, each block has a "dirty" bit set, indicating that it or something below it has changed.

At 404, a commitment thread (that periodically acquires the top-level lock) reserves an amount of unused disk space from the free list, and performs a depth-first iteration down the tree, covering the portion of the tree with the dirty bit set. While iterating downwards, it copies all of the tree nodes with the dirty bit set and updates the disk locations to represent their soon-to-be new locations on disk. Data is never updated in place, but rather always copied-on-write to a new location.

At 406, the in-memory allocation freelist is updated based on what disk space was released, and the toplevel lock is released. The writes to all the nodes below the superblock are then performed. Then, a request is sent to the storage system to flush the results to the storage medium. As used herein, "flush" means to physically write the data to the long term storage medium as opposed to keeping it in any intermediate or cached location. After this request completes, at 408, the superblock version number is updated and the new version of the superblock (containing the tree root information) is written to disk over the oldest version of the superblock. Then another storage medium flush operation is performed.

This technique has a number of advantages over a traditional read-optimized approach. As one example, it allows transactional properties (many changes to be made atomically) without the use of a journal. Also, it is write-optimized in that the majority of the writes are contiguous. Unlike with a traditional filesystem, it is not seeking to past places on the disk and updating them. Additionally, solid state disks that do wear-balancing have an easier time because of the large contiguous writes.

Yet another advantage is that it avoids filesystem corruption that can happen with the "write hole" (a disk block that is partially written before a system or power failure may become unreadable). Specifically, at all times the data structure on disk is kept in a consistent state. Because the entire old tree structure is left intact while commitment occurs, if a power failure happens at any time before the completion of the superblock write then a future instance of the file system will read the data that was present before the commit. The flush waits for the write to complete entirely, so a superblock referring to the new disk structure is not written until the previous write completes.

Data Distribution and Overlay Networks

Data (such as an email attachment called "sales.doc") may be physically located on the same node from which it is requested. For example, when Bob uses the mail application on node 102, an attachment sent to him by another employee, Charlie, may be stored in node 102's local storage. If the same message or attachment is being delivered to multiple users, then the fork type 2 operation allows the same data to have a different names such as one per user of the mail system. Also, if the same attachment is delivered multiple times in separate transactions, then the use of hashes for data chunks will allow the actual chunk data to not be duplicated as described above. Typically, multiple copies of the data will be maintained (e.g., for backup/redundancy purposes) on multiple nodes instead of a single node. For example, sales.doc may be additionally accessible from node 104 and from node 106. In some cases, the file may not be present on the node from which it is requested. For example, when node 108 is used to offset some of the load on node 102, if Bob uses node 108 as his mail server, it is possible that node 108 may not have a local copy of the document.

As explained above, data on a particular node (such as node 102) is accessed at the local level via a local index (e.g., the local object name index). Additionally, each node in the cluster shown in FIG. 1 maintains at least a portion (also referred to herein as a "slice") of a global, distributed index. The distributed index maps a global filename to one or more local data stores. When Bob attempts to access sales.doc, the nodes shown in FIG. 1 cooperate to determine which specific nodes house the appropriate data, typically selecting the node closest to Bob as the appropriate node to supply the data.

A variety of techniques can be used to partition, distribute, and maintain such a global index. As one example, a centralized index could be used (and the global index maintained there instead of in slices.) In various embodiments, multiple search and indexing methods are available to the cluster, and can be selected based on the system size.

Replicated Distributed Slices

In this approach, the global index is split into parts and a subset of the nodes in the cluster are responsible for a given number of the slices. As one example, suppose node 112 is responsible for the slice of the global index that indicates where sales.doc is located. If queried for a location of the file, node 112 will respond with instructions to contact at least one of nodes 102, 104, and 106—the nodes on which copies of sales.doc are present.

The decisions of when to move a portion of the index from one slice to a neighboring slice is made by the node responsible for that source slice. When a node notices that it has a fraction of the global index larger than its fair share it can request neighboring nodes to move the boundaries of their slice to be a more fair division of the index data. Since each slice has a set of nodes maintaining it, high reliability is obtained. Let the number of nodes be $N_b$ and the number of stored elements be $N_e$. In this technique, $N_i$ indices are maintained and distributed among the bricks with a replication factor of $N_b/N_i$ copies of each index. Each brick maintains $N_b/N_i$ indices and $(N_e \times N_b)/Ni^2$ data elements. Data objects are mapped to one of the $N_i$; indices using a definitive map based on static attributes. For example if $N_e$=10,000,000 data objects, $N_b$=1000 nodes, and if a replication factor of 5 index copies is set, $N_i$=1000/5=200. Each node maintains index information for a total of 250,000 data objects in its 5 indices. The index replication factor is high enough to insure the index is reliably accessible from each cell in the system. The lookup problem reduces to identifying the index order and then searching the high probability indices. The indices give specific answers to queries on its primary attributes but can also give probabilistic or likely neighborhood answers for queries on non-primary attributes.

Guess and Expand

This technique uses an algorithm that converges a search by starting at a likely location and expanding outward using some metric to define the search geometry (not necessarily physical space). The search space structure is able to vary by search attributes, thus yielding geometries in search space that are optimal for finding data based on the given attributes.

Overlay Network

Because of unreliable network connections, security concerns, and the fact that it is not always possible to directly connect between any two networked computers (for example, between intranets), in some embodiments an overlay network is formed between nodes. For example, a unique node address can be assigned to each node and SSL connections can be formed between nodes so as to form a redundant graph of connections between nodes. Individual requests to pass messages are then routed between nodes according to a routing table formed with a distance vector or link state routing protocol. It is also possible to operate the overlay network in a fully meshed mode where every node talks to every other node. Other embodiments may use different protocols and overlay network techniques which are well known to distributed systems practitioners.

Skip Graphs

Skip graphs are a technique that can be used for data lookup or sub-index determination. A skip graph provides a method for storage organization searching where each node has partial information on data location (such as the replicated slices above).

Metadata Location Storage

Yet another technique that can be employed is for each instance of the file to have stored with it metadata that can identify the location of every other file instance. In this scenario, a technique such as Guess and Expand I used to find the initial copy and the Metadata Location Storage technique is used to locate the most appropriate copy to send to the requestor. In this scenario, updates to every copy are required whenever the storage locations of the other copies change.

Making Cooperative Decisions

In a computing environment arranged using a traditional centralized model, decision-making tasks are performed by the central manager, and pushed to/carried out by the managed nodes. Accordingly, tasks such as confirming that distributed copies of data are in sync are relatively straightforward. For example, the central manager is the arbiter of what it means to be a current copy of the data, and can thus instruct any nodes holding the data to confirm that they comply. Similarly, if a managed node in a centrally managed environment needs exclusive access to a resource, it need only ask the central manager, which will either grant or deny the request.

In contrast, in the environment shown in FIG. 1, each node in the cluster is effectively equal to the other nodes with respect to its ability to take various actions. While there may be limited contexts in which an individual node has more "authority" over an aspect of the network than another (e.g., because it holds a particular slice of the global index pertaining to a resource such as a file), nodes do not consistently look to a centralized decision maker (e.g., to ask permission) when resolving conflicts. As explained in conjunction with FIG. 1, node 102 is configured to make use of a variety of distributed protocols 136. For example, the nodes in the cluster shown in FIG. 1 can use logical clocks, and techniques that leverage those logical clocks such as locking techniques (either advisory or not) and atomic commitment techniques, to make mutual decisions about the management of the distributed data.

Logical Clock

A logical clock can be used to provide a globally agreed upon total ordering of the sequence of events. When two actions happen in a network which both affect the same resource, such as a write to a file, it is necessary for the system to have a consistent agreement regarding which file write happened first. Without these kinds of guarantees the consistency of the system can degrade and different files might show different final results from performing the same operations in different orders.

One example of a basic logical clock system is described by Leslie Lamport in "Time, Clocks, and the Ordering of Events," Communications of the ACM 21, 7 (July 1978), 558-565. In short, the basic Lamport system includes a logical clock whose value is attached to messages exchanged by nodes, and whose value (at a given node) increases whenever the node sends or receives a message.

In some embodiments, the suite of distributed protocols 136 available on a node such as node 102 includes an improved logical clock. For example, nodes can synchronize system times with the messages they exchange by using a technique such as the Network Time Protocol (defined in RFC 1305). Additionally, instead of incrementing the logical time by a value of one, in some embodiments logical time is incremented by an amount proportional to the elapsed system time since the last message. If this is an insufficient increment amount to satisfy the properties of the basic logical clock, the greater logical clock value can be used instead. In some embodiments the logical time is incremented to the maximum of the standard logical clock value and the node's system time.

Locking

If a resource must be accessed exclusively by a single entity in order to guarantee consistency, then some form of locking is needed that guarantees mutual exclusion properties. While simple methods exist for acquiring an exclusive lock within a single computer system, a different approach is needed to provide the analogous set of properties in a distributed system of multiple computers. Locking a file can guarantee for example that once an application has read a bank balance it will not change until after the application has finished making any adjustments it will make.

One example of a basic distributed file lock is described in the Lamport reference above. In short, in the Lamport lock, each node has a queue ordered by the logical request time. New lock requests are added to the end of the local queue and then inserted in all other queues using the same logical time. When a response has been received from all responsible nodes that a request is at the head of the queue, then the lock is "held" by the requester. The requester must send a release message (and receive a successful response from all nodes) in order to release the lock for the next requester.

In some embodiments, the suite of distributed protocols 136 available on a node such as node 102 includes an improved technique for performing distributed file locking. For example, nodes can associate a standard timeout with every lock that is acquired. This way, even if the lock holder node becomes unreachable on the network the lock will be released eventually. Nodes can also request for their timeout to be extended at regular intervals by sending messages which prove they are alive and reachable on the network. It is also possible for nodes to request a specific type of lock such as a read lock as opposed to a write lock. This allows for the system to grant multiple read locks simultaneously and still guarantee that no other locks are granted concurrently with a write lock. Nodes can also receive a semi-opaque lock token to prove that they own the lock. Some parts of this token will be viewable by any application so information about the lock grant time or the associated resource can be provided. Other parts of the token may only be understood by the locking subsystem itself. These portions may have internal information about the servers granting the lock or security information to prove that the token was generated by part of the locking system.

Atomic Commitment

One way to guarantee that a consistent state is maintained and there is never disagreement about which actions have or have not occurred on a given object, is to use an atomic commitment protocol. The goal of an atomic commitment protocol is for nodes to agree on some message. As used herein, the message (which is either agreed upon or not agreed upon by the atomic commitment protocol) is also referred to as the "decree." In the system shown in FIG. 1, a variety of decrees may be sought to be agreed upon. For example, a decree can contain the contents and location of a file write operation or a declaration that a set of nodes are alive on the network at a given time.

One example of a basic atomic commitment protocol (known as "Paxos") is described by Leslie Lamport in "The Part-Time Parliament," ACM Transactions on Computer Systems 16, 2 (May 1998), 133-169. Unfortunately, existing atomic commitment protocols, such as Paxos, require maintaining, indefinitely, a history of all past votes. Additionally, existing systems do not allow for dynamic changes to the set of participant nodes while the system is in use. In virtually any computing environment, nodes will fail and be brought into service unexpectedly.

Accordingly, in some embodiments a refined atomic commitment protocol is included in the distributed protocols (136) available to a node such as 102. For example, a mechanism exists for cleaning out old vote history to limit memory growth. Also, an operation allowing for an instance of the Paxos protocol to be handed off to a different set of participant nodes (a process referred to herein as a "run-time committee change") without losing protocol guarantees of atomic commitment is provided. And, a return channel exists for participants to provide additional information about their vote to the vote leader. This information may optionally be provided in summary or in compete form as additional information in the final commitment message.

Journal Synchronization

Figure 5:
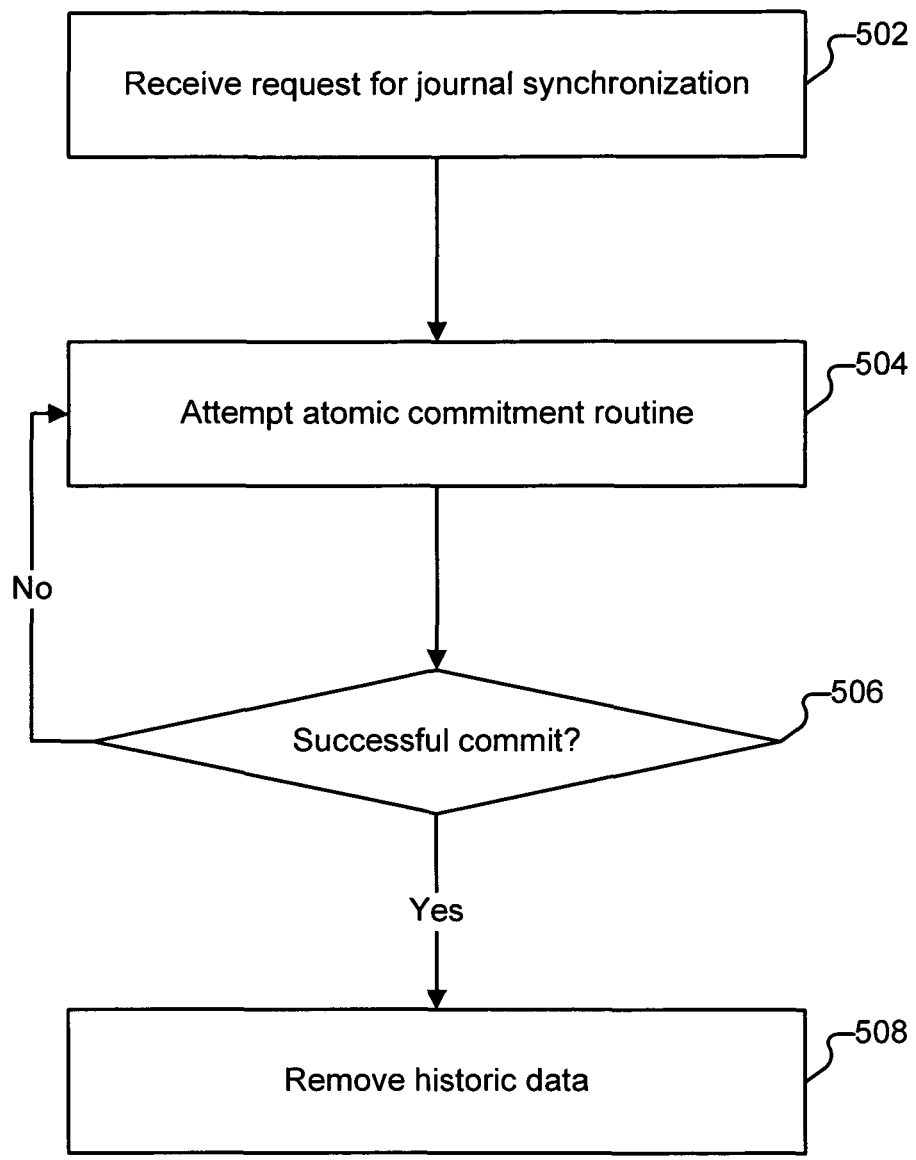
FIG. 5 illustrates an embodiment of a process for cleaning out old vote history.

FIG. 5 illustrates an embodiment of a process for cleaning out old vote history. The process begins at 502 when a request for journal synchronization is initiated. For example, a cron job or other periodic process might initiate such a request from time to time at 502. The request can also be initiated by a user. At 504, an atomic commitment routine is attempted. For example, at 504, an atomic commitment using the Paxos protocol as modified above is initiated. If the commit is successful (506), at 508 the applicable historic vote data can be removed. If the atomic commitment decree is not accepted, then the old vote data must be kept (until such time as portion 504 of the process results in a successful commit.

In some embodiments, synchronization points are implemented to facilitate the removal of old journal entries. A synchronization control command only has a single revision number as a parameter. If the vote commits, then the committee members may remove all journal entries earlier than the specified revision number for that specific Paxos instance. For a committee member to accept a journal synchronization request they must have successfully committed all actions up to and including the requested revision number. If the condition fails, then a PAXOS_NOT_READY transient error is returned to the requesting node and the ballot is not accepted. After a synchronization request has been committed all NextBallot and BeginBallot request for previous revisions are sent the permanent error reply PAXOS_NEED_SYNC. The requesting node is responsible for taking the appropriate actions to resynchronize itself with the rest of the committee. Since all commits are distributed by best effort multicast, this typically indicates that the node receiving the error has been off the network for a while.

Run-Time Committee Changes

Figure 6:
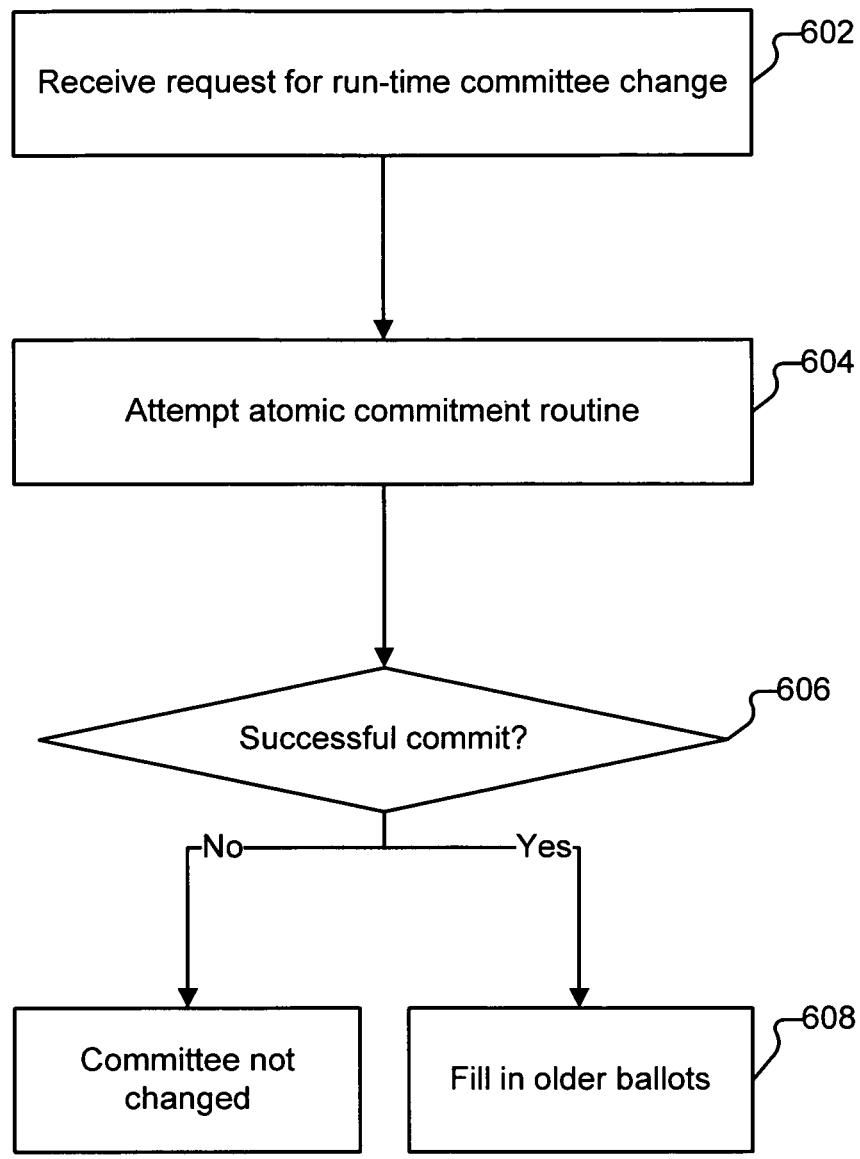
FIG. 6 illustrate an embodiment of a process for conducting a run-time committee change.

FIG. 6 illustrate an embodiment of a process for conducting a run-time committee change. The process begins at 602 when a request for a run-time committee change is initiated. For example, a user may initiate the request at 602 if a better set than the current set of participants in the atomic commitment protocol is identified. The process may also be initiated by a node, as applicable. At 604, an atomic commitment is attempted. If the change decree is accepted (606), at 608 any missing revisions from before the cut-over revision can be completed as needed. If the change decree is not accepted, the committee members remain unchanged (610).

In some embodiments, the decree is formed by proposing a new Set ID along with a new cut-over revision and a new list of participant nodes for future atomic commitment actions. All atomic commitment protocol messages specify the SetID they are using when attempting to agree on a given revision. If a SetID being used is not the correct SetID for the given revision range then the decree request will be rejected. Appropriate SetIDs for given ranges of revisions are kept and destroyed in the same way as vote histories for those same revisions. When a new node is joining the atomic commitment process is it necessary for it to obtain a copy of the data which is current as of the cut-over revision. Any decrees prior to the cut-over revision will be rejected by the newly joining nodes unless the decree is a journal synchronization request, in which case it will be accepted. When a node accepts a decree which removes that node from the participant set it must begin returning transient errors for all new decree requests. If the change is ultimately committed then the node returns permanent errors for all decree requests after the cut-off revision since it is no longer responsible for responding to those decisions. If the RTCC decree is replaced with another decree, however, then the node must begin responding normally to decree requests again.

If the RTCC decree commits then a cleanup process takes place. In some embodiments the original proposing node takes responsibility for the cleanup actions. First, the node attempts to commit a journal synchronization request with a cut-off revision after the RTCC cut-over revision. If this succeeds then the cleanup is complete. If the journal synchronization request fails then the cleaning node must query the vote history of all nodes and determine the correct results for the revisions that are not committed on all nodes. Once this result is determined an announcement is made for all nodes to commit either a decree discovered to already have a majority or an empty revision. When all revisions prior to the cut-over revision have thus been committed then the journal synchronization request can be attempted again and should succeed.

Deleting Content

One problem that can occur in distributed data systems is that data storage reliability can counteract data deletion and version management reliability. For example, suppose a user wishes to delete a file for which multiple copies exist, one of which is stored at a location that is temporarily inaccessible. If the situation is not properly mitigated, when the inaccessible machine comes back online, so too will the otherwise deleted copy (sometimes referred to as a "ghost" copy). Accordingly, in some embodiments the following technique, or a similar technique, is used to handle delete requests.

Figure 7:
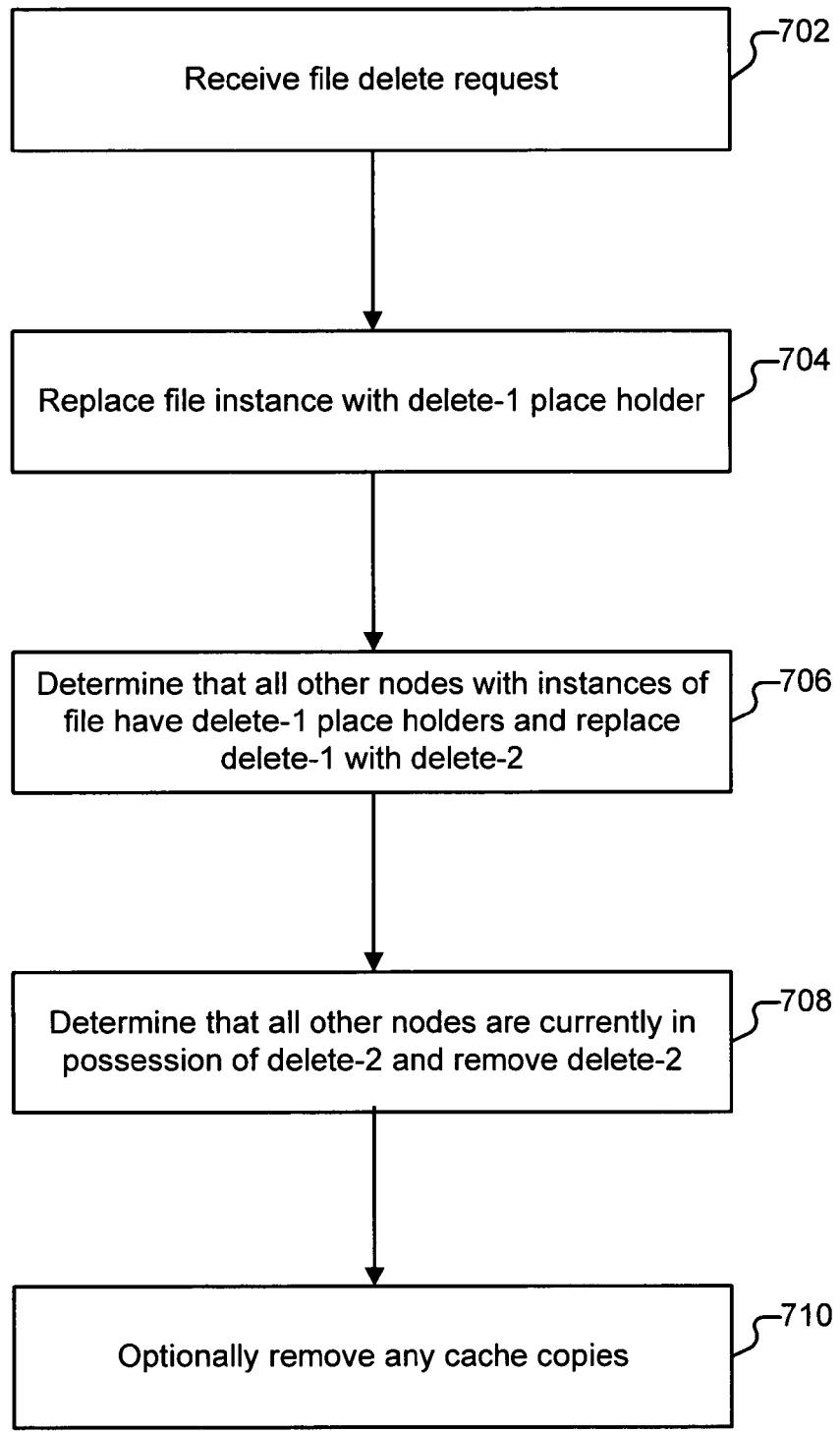
FIG. 7 illustrates an embodiment of a process for removing content from a distributed system.

FIG. 7 illustrates an embodiment of a process for removing content from a distributed system. In various embodiments the process, or a portion thereof, is performed by a node (node 104 in the following example) that holds a copy of a file to be deleted.

The process begins at 702 when a file delete request is received. The delete request may be received from either a user, or from an application. For example, suppose a sales engineer has decided to delete a file ("sales.txt") from the Acme Corporation Wiki, a service that is provided (as with the mail application) by the infrastructure shown in FIG. 1. The Wiki's content is spread across a total of three nodes—nodes 104, 108, and 110. At 702, node 104 receives a file delete request (e.g. from the Wiki application). Nodes 108 and 110 are sent similar requests.

At 704, node 104 replaces its copy of sales.txt with a first delete token ("delete-1"). Nodes 108 and 110 similarly replace their respective instances of sales.txt with first delete tokens. Both first and second delete tokens contain a list of nodes with copies of the file. This allows any delete token to be used to find all other nodes which should also have delete tokens.

When it is determined that all nodes with a copy of the file (e.g., nodes 108 and 110) have replaced their respective copies with first delete tokens, at 706 node 104 replaces delete-1 with a second delete token ("delete-2"). Nodes 108 and 110 similarly replace their respective first tokens with second tokens. At this time node 104 has received successful responses from all other nodes in response to the request for replacing the file with the first delete token. At this point node 104 can safely remove the file from the distributed index or make a request for the file to be removed if the index entry is on another node.

When it is determined that the appropriate nodes (e.g., nodes 108 and 110) have replaced their respective first tokens with second tokens, at 708 node 104 removes delete-2. Nodes 108 and 110 similarly remove their respective second tokens.

In addition to the three primary replicas of the file, data may also exist as a cached copy. Unlike primary replicas, cached copies have associated timeouts and will thus eventually be removed without intervention. In various embodiments, nodes are instructed to disable any cached copies of the file (710). The cached copies (if present) can also be allowed to expire according to schedule, as applicable.

In the above example, all of the nodes holding the file to be deleted were up at the time of the delete request. Suppose, however, one of the nodes (e.g., node 110) was unavailable at the time a request to delete sales.txt was made. In some embodiments, if a node that holds a copy of the file is not present at the time the request is received (702), the process is terminated, without progressing to portion 704.

In the example described in conjunction with FIG. 7, each of the nodes that was expected to have a copy sales.txt did have a copy. Suppose, however, one of the nodes (e.g., node 108) holds no record of the file and sees that node 110 and/or node 104 has a delete-1 token for sales.txt. In some embodiments, node 108 will add a delete-1 token for the file in its records. If node 108 holds no record of the file and instead sees that node 110 and/or node 104 has a delete-2 token for sales.txt, node 108 will not add a delete-2 token for the file in its records.

Selecting Data Storage Locations

In some embodiments, nodes are configured to collect statistics pertaining to the files included in their respective global index slices. Examples of information that can be collected include how frequently requests for the location of a file are received, the identity of the requestor, the location of the requestor, and how frequently the data chunks comprising the file are fetched. Information on attributes of accessed objects can also be incorporated into the statistical information in order to guide file storage policy, allocation, and distributed storage decisions.

For example, as explained above, suppose node 112 is in charge of the slice of the global index that includes sales.doc. Node 112 is configured to keep track of the number of times Bob accesses sales.doc. Suppose another user, Dave, who is located in Frankfurt, has several times requested a file that is maintained by node 102. Node 108, which does not contain a copy of the file, is considerably closer to Dave than is node 102. As described in more detail below, in some embodiments Dave's repeated requests for the file will cause a copy of the file to be placed on node 108. Other factors can also be considered when determining where data should be located. For example, while node 108 may be closer to Dave, it may also have network load/capacity restrictions. Node 108 may also be subject to regulatory and/or administrative rules that prohibit (or restrict, or permit, as applicable) data from being stored in its local store.

In some embodiments, once it has been determined that a first node should move a file to a second node via the collected statistics, the first node begins the transfer with a request to the second node to store the file. This gives the second node the opportunity to notify the first node of conditions, such as that it already has a cached copy or doesn't have enough space to store the file.

If the second node already has a cached copy then a checksum can be verified. If it matches the current version of the file then the second node is asked to promote the cached copy to a full copy of the file. If the second node does not have the file but does have space for it then the first node sends the file to the second file using a network transport appropriate to the level of security the file requires.

Assuming that the second node now has a real copy of the file, the first node is now only required to keep a pointer reference in place so that it can redirect any incoming requests to the second node. One way to accomplish this is for the first node to demote its copy to a cached copy using the standard cache time-out. This would allow it to still handle some of the incoming read requests until the cached copy is destroyed, at which point the requests would be redirected to the second node.

Eventually, the global index is updated so that there are no longer any outstanding references to the first node with respect to the file. At such time, the first node can remove the pointer reference to the second node.

Figure 8:
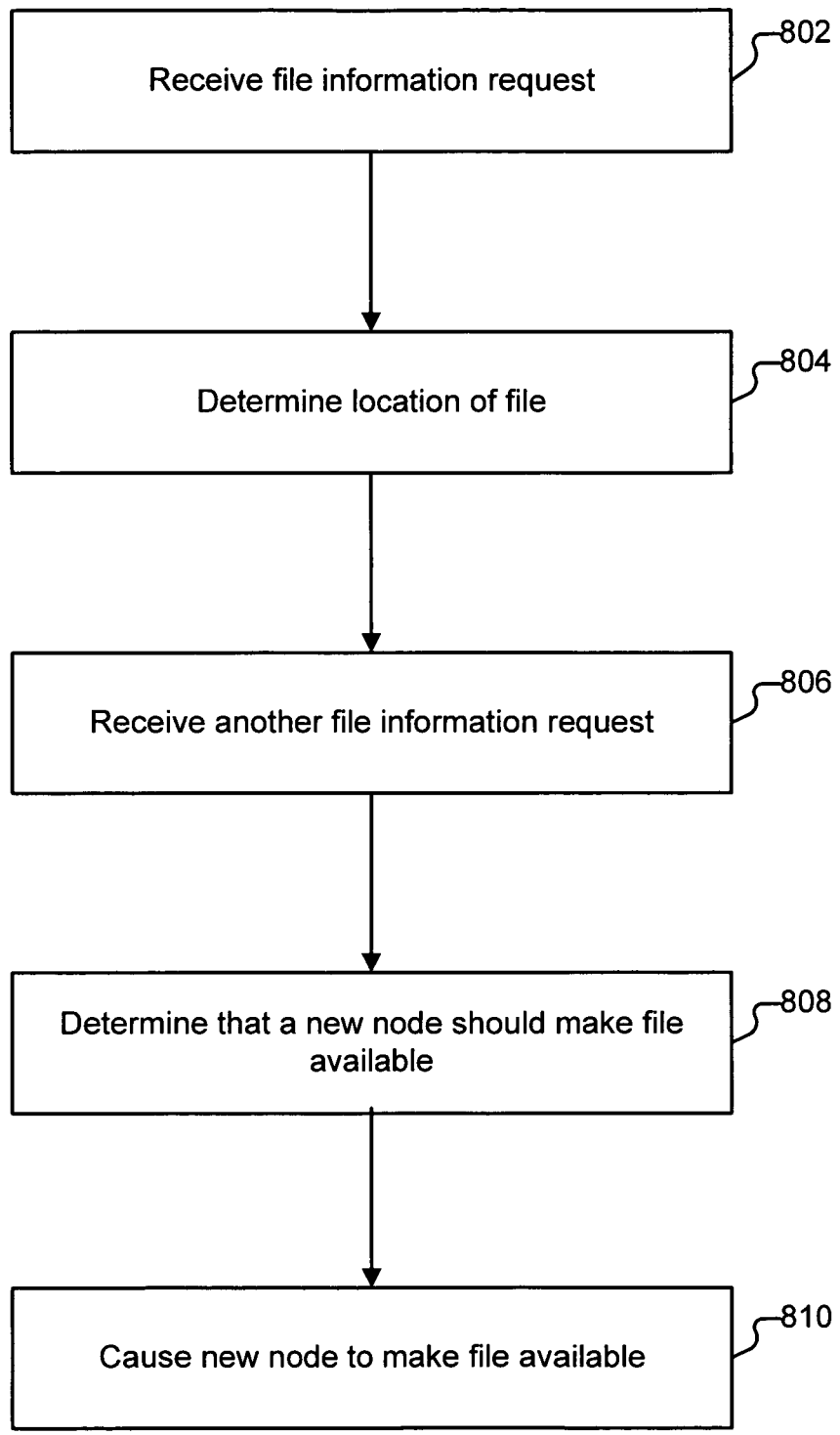
FIG. 8 illustrates an embodiment of a process for distributing data.

FIG. 8 illustrates an embodiment of a process for distributing data. In various embodiments the process is performed by a node that holds a portion of a global index that references a file.

The process begins at 802 when a request for data associated with the file is received. For example, an application such as a mail server application may request from the node (e.g., 112) holding the appropriate slice of the global index a location of an attachment. At 802 the request is received by node 112. At 804, a determination is made that the file is located on a second node. For example, at 804 node 112 determines that the attachment is currently located at node 102.

At 806, a second request for data associated with the file is received. For example, at 806, node 112 receives another request for the file from the mail server application. At 808, a determination is made that a third node (e.g., node 108) should be instructed to make the file available to requestors. And, at 810, the third node is caused to make available the file. For example, at 810, node 102 is instructed to send a copy to node 108.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for deleting content comprising:
   receiving at a first node a delete request for a file, a primary copy of which is stored on each of at least a subset of a plurality of nodes, wherein at least one other node of the plurality of nodes has received the delete request for the file;
   replacing the file at the first node with a first delete token, the first delete token comprising data identifying one or more nodes comprising the plurality of nodes on which a primary copy of the file is stored;
   determining at a second node of the plurality of nodes that the second node does not have a record of the file;
   in response at least in part to a determination by the second node that at least some other nodes in the plurality of nodes have replaced their respective copies of the file with first delete tokens, adding a first delete token for the file in records associated with the second node;
   determining, based at least in part on the first node receiving successful responses from all other nodes in the plurality of nodes in response to the request, that all other nodes in the plurality of nodes have replaced their respective copies of the file with first delete tokens;
   in response at least in part to the determination that all other nodes in the plurality of nodes have replaced their respective copies of the file with first delete tokens:
      causing an entry associated with the file to be removed from a distributed index by the first node; and
      replacing the first delete token at the first node with a second delete token;
   determining by the first node that at least some other nodes in the plurality of nodes have replaced their respective first delete tokens with second delete tokens;
   in response to the determination by the first node that at least some other nodes in the plurality of nodes have replaced their respective first delete tokens with second delete tokens, removing the second delete token from the first node;
   determining by the second node that at least some other nodes in the plurality of nodes have replaced their respective first delete tokens with second delete tokens; and
   in response to the determination by the second node that at least some other nodes in the plurality of nodes have replaced their respective first delete tokens with second delete tokens, not adding a second delete token for the file in the records associated with the second node.

2. The method of claim 1, wherein the first delete token includes a list of the other nodes in the plurality of nodes, wherein the list of other nodes is usable to find all other nodes in the plurality of nodes that should also have first delete tokens.

3. The method of claim 1, wherein the delete request is generated by a user.

4. The method of claim 1, wherein the delete request is generated by an application.

5. The method of claim 1, in response to the delete request for the file, further comprising disabling a cached copy of the file at the first node.

6. The method of claim 5, wherein the primary copy of the file is different from the cached copy of the file.

7. The method of claim 1, wherein portions of the distributed index are stored by at least a subset of the plurality of nodes and wherein causing the entry associated with the file to be removed from the distributed index by the first node includes:
   determining at the first node whether the first node stores a portion of the distributed index that includes the entry associated with the file;
   in the event that the first node does store the portion of the distributed index that includes the entry associated with the file, removing the entry associated with the file from the portion of the distributed index at the first node; and
   in the event that the first node does not store the portion of the distributed index that includes the entry associated with the file, sending a request from the first node to another node that does store the portion of the distributed index to remove the entry associated with the file from the portion of the distributed index.

8. A system for deleting content, comprising:
   a processor configured to:
   receive at a first node a delete request for a file, a primary copy of which is stored on each of at least a subset of a plurality of nodes, wherein at least one other node of the plurality of nodes has received the delete request for the file;
   replace the file at the first node with a first delete token, the first delete token comprising data identifying one or more nodes comprising the plurality of nodes on which a primary copy of the file is stored;
   determine at a second node of the plurality of nodes that the second node does not have a record of the file;
   in response at least in part to a determination by the second node that at least some other nodes in the plurality of nodes have replaced their respective copies of the file with first delete tokens, add a first delete token for the file in records associated with the second node;
   determine, based at least in part on the first node receiving successful responses from all other nodes in the plurality of nodes in response to the request, that all other nodes in the plurality of nodes have replaced their respective copies of the file with first delete tokens;
   in response at least in part to the determination that all other nodes in the plurality of nodes have replaced their respective copies of the file with first delete tokens:

cause an entry associated with the file to be removed from a distributed index by the first node; and
replace the first delete token at the first node with a second delete token;
determine by the first node that at least some other nodes in the plurality of nodes have replaced their respective first delete tokens with second delete tokens;
in response to the determination by the first node that at least some other nodes in the plurality of nodes have replaced their respective first delete tokens with second delete tokens, remove the second delete token from the first node;
determine by the second node that at least some other nodes in the plurality of nodes have replaced their respective first delete tokens with second delete tokens; and
in response to the determination by the second node that at least some other nodes in the plurality of nodes have replaced their respective first delete tokens with second delete tokens, do not add a second delete token for the file in the records associated with the second node; and
a memory coupled to the processor and configured to provide the processor with instructions.

9. The system of claim 8, wherein the first delete token includes a list of the other nodes in the plurality of nodes, wherein the list of other nodes is usable to find all other nodes in the plurality of nodes that should also have first delete tokens.

10. The system of claim 8, wherein the delete request is generated by a user.

11. The system of claim 8, wherein the delete request is generated by an application.

12. The system of claim 8, in response to the delete request for the file, wherein the processor is further configured to disable a cached copy of the file at the first node.

13. The system of claim 12, wherein the primary copy of the file is different from the cached copy of the file.

14. The system of claim 8, wherein portions of the distributed index are stored by at least a subset of the plurality of nodes and wherein causing the entry associated with the file to be removed from the distributed index by the first node includes the processor being configured to:
determine at the first node whether the first node stores a portion of the distributed index that includes the entry associated with the file;
in the event that the first node does store the portion of the distributed index that includes the entry associated with the file, remove the entry associated with the file from the portion of the distributed index at the first node; and
in the event that the first node does not store the portion of the distributed index that includes the entry associated with the file, send a request from the first node to another node that does store the portion of the distributed index to remove the entry associated with the file from the portion of the distributed index.

15. A computer program product for deleting content, the computer program product being embodied in a non-transitory computer readable storage medium and comprising computer instructions for:
receiving at a first node a delete request for a file, a primary copy of which is stored on each of at least a subset of a plurality of nodes, wherein at least one other node of the plurality of nodes has received the delete request for the file;
replacing the file at the first node with a first delete token, the first delete token comprising data identifying one or more nodes comprising the plurality of nodes on which a primary copy of the file is stored;
determining at a second node of the plurality of nodes that the second node does not have a record of the file;
in response at least in part to a determination by the second node that at least some other nodes in the plurality of nodes have replaced their respective copies of the file with first delete tokens, adding a first delete token for the file in records associated with the second node;
determining, based at least in part on the first node receiving successful responses from all other nodes in the plurality of nodes in response to the request, that all other nodes in the plurality of nodes have replaced their respective copies of the file with first delete tokens;
in response at least in part to the determination that all other nodes in the plurality of nodes have replaced their respective copies of the file with first delete tokens:
causing an entry associated with the file to be removed from a distributed index by the first node; and
replacing the first delete token at the first node with a second delete token;
determining by the first node that at least some other nodes in the plurality of nodes have replaced their respective first delete tokens with second delete tokens;
in response to the determination by the first node that at least some other nodes in the plurality of nodes have replaced their respective first delete tokens with second delete tokens, removing the second delete token from the first node;
determining by the second node that at least some other nodes in the plurality of nodes have replaced their respective first delete tokens with second delete tokens; and
in response to the determination by the second node that at least some other nodes in the plurality of nodes have replaced their respective first delete tokens with second delete tokens, not adding a second delete token for the file in the records associated with the second node.

16. The computer program product of claim 15, wherein the first delete token includes a list of the other nodes in the plurality of nodes, wherein the list of other nodes is usable to find all other nodes in the plurality of nodes that should also have first delete tokens.

17. The computer program product of claim 15, wherein the delete request is generated by a user.

18. The computer program product of claim 15, wherein the delete request is generated by an application.

19. The computer program product of claim 15, in response to the delete request for the file, further comprising disabling a cached copy of the file at the first node.

20. The computer program product of claim 19, wherein the primary copy of the file is different from the cached copy of the file.

21. The computer program product of claim 15, wherein portions of the distributed index are stored by at least a subset of the plurality of nodes and wherein causing the entry associated with the file to be removed from the distributed index by the first node includes:
determining at the first node whether the first node stores a portion of the distributed index that includes the entry associated with the file;
in the event that the first node does store the portion of the distributed index that includes the entry associated with the file, removing the entry associated with the file from the portion of the distributed index at the first node; and
in the event that the first node does not store the portion of the distributed index that includes the entry associated with the file, sending a request from the first node to another node that does store the portion of the distributed index to remove the entry associated with the file from the portion of the distributed index.

* * * * *